(12) United States Patent
Gelmetti (10) Patent No.: US 9,950,857 B1
(45) Date of Patent: Apr. 24, 2018

(54) WELDING WIRE CONTAINER

(71) Applicant: SIDERGAS SPA, S. Ambrogio di Valpolicella (IT)

(72) Inventor: Carlo Gelmetti, Lazise (IT)

(73) Assignee: SIDERGAS SPA (IT)

( * ) Notice: Subject to any disclaimer, the term of this patent is extended or adjusted under 35 U.S.C. 154(b) by 0 days.

(21) Appl. No.: 15/295,797

(22) Filed: Oct. 17, 2016

(51) Int. Cl.
*B65D 85/04* (2006.01)
*B65D 19/06* (2006.01)

(52) U.S. Cl.
CPC ............. *B65D 85/04* (2013.01); *B65D 19/06* (2013.01); *B65D 2519/00034* (2013.01); *B65D 2519/00054* (2013.01); *B65D 2519/00626* (2013.01)

(58) Field of Classification Search
CPC ...... B23K 9/1333; B65D 19/06; B65D 85/00; B65D 85/04; B65D 2519/00034; B65D 2519/00054; B65D 2519/00626
USPC .......... 206/389, 397, 408, 409; 242/170–172
See application file for complete search history.

(56) References Cited

U.S. PATENT DOCUMENTS

| | | |
|---|---|---|
| RE8,148 E | 4/1878 | Meinikheim ................. 220/485 |
| 318,062 A | 5/1885 | Warren |
| 532,565 A | 1/1895 | Kilmer |
| 617,353 A | 1/1899 | Redmond |
| 627,722 A | 6/1899 | Edwards |
| 932,808 A | 8/1909 | Pelton |
| 1,276,117 A | 8/1918 | Riebe ............................ 464/171 |
| 1,468,994 A | 9/1923 | Cook ............................. 206/393 |
| 1,508,689 A | 9/1924 | Glasser .................... 219/124.03 |
| 1,640,368 A | 8/1927 | Obetz |
| 1,821,354 A | 9/1931 | Meyer ........................... 242/159 |
| 1,907,051 A | 5/1933 | Emery |
| 1,936,227 A | 11/1933 | Cook |
| 2,027,670 A | 1/1936 | Broeren .......................... 312/62 |
| 2,027,674 A | 1/1936 | Broeren .......................... 312/60 |
| 2,059,462 A | 11/1936 | Jungmann |
| 2,260,230 A | 10/1941 | Olson ........................... 229/119 |
| 2,319,628 A | 5/1943 | Pinniger ....................... 220/485 |
| 2,329,369 A | 9/1943 | Haver ............................. 285/11 |
| 2,366,101 A | 12/1944 | Grothey ...................... 66/125 R |
| 2,407,746 A | 9/1946 | Johnson |
| 2,457,910 A | 1/1949 | McLaren et al. ............... 74/501 |
| 2,477,059 A | 7/1949 | Hill ............................. 242/137.1 |
| 2,483,760 A | 10/1949 | Duncan ......................... 254/190 |
| 2,579,131 A | 12/1951 | Tinsley ......................... 206/409 |

(Continued)

FOREIGN PATENT DOCUMENTS

| | | | |
|---|---|---|---|
| CN | 1466469 | 1/2004 | ............. A61L 15/60 |
| CN | 1626423 | 6/2005 | ............. B65H 75/16 |

(Continued)

OTHER PUBLICATIONS

European Office Action issued in application No. 16180212.9, dated Jan. 19, 2017 (7 pgs).

(Continued)

*Primary Examiner* — Bryon Gehman
(74) *Attorney, Agent, or Firm* — Hayes Soloway P.C.

(57) ABSTRACT

A welding wire container has a base element, a plurality of walls which extend upwardly from the base element and circumscribe a space in which a coil of welding wire can be placed. A reinforcement post is arranged in each of the corners of the space. A spacing rod is provided between adjacent reinforcement posts.

30 Claims, 8 Drawing Sheets

(56) References Cited

U.S. PATENT DOCUMENTS

| | | | |
|---|---|---|---|
| 2,580,900 A | 1/1952 | Epstein | 206/409 |
| 2,679,571 A | 5/1954 | Chappel | 219/137.44 |
| 2,694,130 A | 11/1954 | Howard | 219/8 |
| 2,713,938 A | 7/1955 | Snyder | |
| 2,724,538 A | 11/1955 | Schweich | |
| 2,752,108 A | 6/1956 | Richardson | 242/128 |
| 2,838,922 A | 6/1958 | Gift | 66/125 R |
| 2,849,195 A | 8/1958 | Richardson | |
| 2,864,565 A | 12/1958 | Whearly | 242/128 |
| 2,869,719 A | 1/1959 | Hubbard | |
| 2,880,305 A | 3/1959 | Baird | |
| 2,911,166 A | 11/1959 | Haugwitz | 242/128 |
| 2,929,576 A | 3/1960 | Henning | |
| 2,966,258 A | 12/1960 | Krafft | |
| 2,974,850 A | 3/1961 | Mayer | |
| 2,984,596 A | 5/1961 | Franer | 206/412 |
| 3,022,415 A | 2/1962 | Francois | 219/137.44 |
| 3,028,066 A | 4/1962 | Bumby | 220/23.9 |
| 3,096,951 A | 7/1963 | Jenson | 242/137.1 |
| 3,108,180 A | 10/1963 | Linnander | 219/137.44 |
| 3,119,042 A | 1/1964 | Bond | |
| 3,185,185 A | 5/1965 | Pfund | |
| 3,244,347 A | 4/1966 | Jenk | |
| 3,274,850 A | 9/1966 | Tascio | 74/501 |
| 3,283,121 A | 11/1966 | Bernard et al. | 219/137.44 |
| 3,284,608 A | 11/1966 | McDonald | 219/137.43 |
| 3,344,682 A | 10/1967 | Bratz | 74/501 |
| 3,352,412 A | 11/1967 | Draving et al. | 206/59 |
| 3,433,504 A | 3/1969 | Hanes | 285/93 |
| 3,463,416 A | 8/1969 | Quenot | 242/396.9 |
| 3,478,435 A | 11/1969 | Cook | |
| 3,491,876 A | 1/1970 | Zecchin | |
| 3,512,635 A | 5/1970 | Lang | |
| 3,536,888 A | 10/1970 | Borneman | 219/137.43 |
| 3,565,129 A | 2/1971 | Field | |
| 3,567,900 A | 3/1971 | Nelson | |
| 3,576,966 A | 5/1971 | Sullivan | |
| 3,595,277 A | 7/1971 | Lefever | |
| 3,648,920 A | 3/1972 | Stump | |
| 3,659,737 A | 5/1972 | Garbe | 217/12 R |
| 3,690,567 A | 9/1972 | Borneman | 239/591 |
| 3,724,249 A | 4/1973 | Asbeck et al. | |
| 3,729,092 A | 4/1973 | Marcell | |
| 3,730,136 A | 5/1973 | Okada | 118/78 |
| 3,799,215 A | 3/1974 | Willems | |
| 3,815,842 A | 6/1974 | Scrogin | 242/423.1 |
| 3,823,894 A | 7/1974 | Frederick et al. | 242/137.1 |
| 3,939,978 A | 2/1976 | Thomaswick | 206/454 |
| 3,958,712 A | 5/1976 | Martin | 217/40 |
| 4,000,797 A | 1/1977 | Ducanis | 193/38 |
| 4,043,331 A | 8/1977 | Martin et al. | 128/156 |
| 4,044,583 A | 8/1977 | Kinney, Jr. | |
| 4,074,105 A | 2/1978 | Minehisa et al. | |
| 4,097,004 A | 6/1978 | Reese | 242/129 |
| 4,102,483 A | 7/1978 | Ueyama et al. | |
| 4,113,795 A | 9/1978 | Izawa et al. | 524/84 |
| 4,127,590 A | 11/1978 | Endo et al. | 260/346.74 |
| 4,157,436 A | 6/1979 | Endo et al. | 528/167 |
| 4,161,248 A | 7/1979 | Kalmanovitch | 206/389 |
| 4,171,783 A | 10/1979 | Waltemath | 242/128 |
| 4,172,375 A | 10/1979 | Rushforth et al. | |
| 4,188,526 A | 2/1980 | Asano | |
| 4,222,535 A | 9/1980 | Hosbein | 242/128 |
| 4,254,322 A | 3/1981 | Asano | |
| 4,274,607 A | 6/1981 | Priest | 242/163 |
| 4,280,951 A | 7/1981 | Saito et al. | 524/118 |
| 4,293,103 A | 10/1981 | Tsukamoto | |
| 4,354,487 A | 10/1982 | Oczkowski et al. | 604/366 |
| 4,392,606 A | 7/1983 | Fremion | 206/600 |
| 4,396,797 A | 8/1983 | Sakuragi et al. | 174/68 |
| 4,429,001 A | 1/1984 | Kolpin et al. | 442/340 |
| 4,451,014 A | 5/1984 | Kitt et al. | 242/128 |
| 4,464,919 A | 8/1984 | Labbe | |
| 4,500,315 A | 2/1985 | Pieniak et al. | 604/379 |
| 4,516,692 A | 5/1985 | Croley | 222/105 |
| 4,540,225 A | 9/1985 | Johnson et al. | 439/192 |
| 4,546,631 A | 10/1985 | Eisinger | |
| 4,575,612 A | 3/1986 | Prunier | 219/137.43 |
| 4,582,198 A | 4/1986 | Ditton | |
| 4,585,487 A | 4/1986 | Destree et al. | |
| 4,623,063 A | 11/1986 | Balkin | |
| 4,742,088 A | 4/1988 | Matsumoto et al. | 528/167 |
| 4,795,057 A | 1/1989 | Jungels et al. | 206/386 |
| 4,826,497 A | 5/1989 | Marcus et al. | 604/359 |
| 4,855,179 A | 8/1989 | Bourland et al. | 442/409 |
| 4,869,367 A | 9/1989 | Kawasaki et al. | 206/409 |
| 4,891,493 A | 1/1990 | Sato et al. | 219/137 |
| 4,916,282 A | 4/1990 | Charming et al. | 219/69.2 |
| 4,918,286 A | 4/1990 | Boyer | 219/137.44 |
| 4,949,567 A | 8/1990 | Corbin | 72/164 |
| 4,974,789 A | 12/1990 | Milburn | 242/159 |
| 5,051,539 A | 9/1991 | Leathers-Wiessner | 174/15.7 |
| 5,061,259 A | 10/1991 | Goldman et al. | 604/368 |
| 5,078,269 A | 1/1992 | Dekko et al. | 206/397 |
| 5,097,951 A * | 3/1992 | Pigott | B65D 19/44 206/397 |
| 5,100,397 A | 3/1992 | Poccia et al. | 604/365 |
| 5,105,943 A | 4/1992 | Lesko et al. | 206/397 |
| 5,109,983 A | 5/1992 | Malone et al. | 206/408 |
| 5,147,646 A | 9/1992 | Graham | 424/424 |
| 5,165,217 A | 11/1992 | Sobel et al. | 242/159 |
| 5,201,419 A | 4/1993 | Hayes | 206/409 |
| 5,205,412 A | 4/1993 | Krieg | 206/394 |
| 5,215,338 A | 6/1993 | Kimura et al. | 285/166 |
| 5,227,314 A | 7/1993 | Brown et al. | 437/10 |
| 5,261,625 A | 11/1993 | Lanoue | 242/129.8 |
| 5,277,314 A | 1/1994 | Cooper et al. | 206/398 |
| 5,279,441 A | 1/1994 | Featherall | 220/485 |
| 5,314,111 A | 5/1994 | Takaku et al. | 229/110 |
| 5,368,245 A | 11/1994 | Fore | 242/171 |
| 5,372,269 A | 12/1994 | Sutton et al. | 220/62 |
| 5,452,841 A | 9/1995 | Sibata | 228/180.5 |
| 5,485,968 A | 1/1996 | Fujioka | 242/172 |
| 5,494,160 A | 2/1996 | Gelmetti | 206/395 |
| 5,530,088 A | 6/1996 | Sheen et al. | 528/287 |
| 5,553,810 A | 9/1996 | Bobeczko | 242/601 |
| 5,562,646 A | 10/1996 | Goldman et al. | 604/368 |
| 5,585,013 A | 12/1996 | Truty | 219/69.12 |
| 5,586,733 A | 12/1996 | Miura et al. | 242/125.2 |
| 5,590,848 A | 1/1997 | Shore et al. | 242/361 |
| 5,629,377 A | 5/1997 | Burgert et al. | 524/832 |
| 5,645,185 A | 7/1997 | Cassina | 220/1.5 |
| 5,665,801 A | 9/1997 | Chang et al. | 524/125 |
| 5,692,700 A | 12/1997 | Bobeczko | 242/588.2 |
| 5,702,001 A | 12/1997 | Russell et al. | 206/388 |
| 5,714,156 A | 2/1998 | Schmidt et al. | 424/404 |
| 5,738,209 A | 4/1998 | Burr et al. | 206/397 |
| 5,739,704 A | 4/1998 | Clark | 326/62 |
| 5,746,380 A | 5/1998 | Chung | 242/171 |
| 5,758,834 A | 6/1998 | Dragoo et al. | 242/128 |
| 5,778,939 A | 7/1998 | Hok-Yin | 138/120 |
| 5,816,466 A | 10/1998 | Seufer | 226/187 |
| 5,819,934 A | 10/1998 | Cooper | 206/397 |
| 5,845,862 A | 12/1998 | Cipriani | 242/423.1 |
| 5,847,184 A | 12/1998 | Kleiner | 558/73 |
| 5,865,051 A | 2/1999 | Otzen et al. | 72/17.3 |
| 5,921,391 A | 7/1999 | Ortiz et al. | 206/397 |
| 5,931,408 A | 8/1999 | Ishii et al. | 242/580 |
| 5,971,308 A | 10/1999 | Boulton | 242/131 |
| 5,988,370 A | 11/1999 | Roemer et al. | 206/215 |
| 5,990,377 A | 11/1999 | Chen et al. | 604/381 |
| 6,016,911 A | 1/2000 | Chen | 200/395 |
| 6,019,303 A | 2/2000 | Cooper | 424/361.4 |
| 6,103,358 A | 8/2000 | Bruggermann et al. | 428/317.9 |
| 6,159,591 A | 12/2000 | Beihoffer et al. | 428/327 |
| 6,237,768 B1 | 5/2001 | Cipriani | 206/408 |
| 6,245,880 B1 | 6/2001 | Takeuchi et al. | 528/287 |
| 6,255,371 B1 | 7/2001 | Schlosser et al. | 524/100 |
| 6,260,781 B1 | 7/2001 | Cooper | 424/361.4 |
| 6,301,944 B1 | 10/2001 | Offer | 72/79 |
| 6,322,016 B1 | 11/2001 | Jacobsson et al. | 424/356.4 |
| 6,340,522 B1 | 1/2002 | Burke et al. | 428/359 |
| 6,408,888 B1 | 6/2002 | Baeumer et al. | 138/120 |
| 6,409,116 B1 | 6/2002 | Brown | 242/419.1 |

(56) References Cited

U.S. PATENT DOCUMENTS

| | | | |
|---|---|---|---|
| 6,417,425 B1 | 7/2002 | Whitmore et al. | 604/367 |
| 6,425,549 B1 | 7/2002 | Bae et al. | 242/580 |
| 6,464,077 B1 | 10/2002 | Liu | 206/388 |
| 6,481,892 B1 | 11/2002 | Agostini | 384/43 |
| 6,498,227 B1 | 12/2002 | Horie | 528/176 |
| 6,524,010 B1 | 2/2003 | Derman | 384/513 |
| 6,547,176 B1 | 4/2003 | Blain et al. | 242/423.1 |
| 6,564,943 B1 | 5/2003 | Barton et al. | 206/395 |
| 6,613,848 B1 | 9/2003 | Wang et al. | 525/481 |
| 6,636,776 B1 | 10/2003 | Barton et al. | 700/169 |
| 6,648,141 B2 | 11/2003 | Land | 206/408 |
| 6,649,870 B1 | 11/2003 | Barton et al. | 219/137 |
| 6,708,864 B2 | 3/2004 | Ferguson, III et al. | 228/56.3 |
| 6,715,608 B1 | 4/2004 | Moore | 206/397 |
| 6,745,899 B1 | 6/2004 | Barton | 206/409 |
| 6,749,139 B2 | 6/2004 | Speck | |
| 6,750,262 B1 | 6/2004 | Hahnle et al. | 521/64 |
| 6,753,454 B1 | 6/2004 | Smith et al. | 602/41 |
| 6,821,454 B2 | 11/2004 | Visca et al. | 34/341 |
| 6,831,142 B2 | 12/2004 | Mertens et al. | 526/328.5 |
| 6,872,275 B2 | 3/2005 | Ko et al. | 156/181 |
| 6,889,835 B2 | 5/2005 | Land | 206/408 |
| 6,913,145 B2 | 7/2005 | Barton | 206/409 |
| 6,938,767 B2 | 9/2005 | Gelmetti | 206/408 |
| 6,977,357 B2 | 12/2005 | Hsu et al. | 219/130.01 |
| 7,004,318 B2 | 2/2006 | Barton | 206/409 |
| 7,108,916 B2 | 9/2006 | Ehrnsperger et al. | 428/403 |
| 7,147,176 B2 | 12/2006 | Rexhaj | 242/417.3 |
| 7,152,735 B2 | 12/2006 | Dragoo et al. | 206/408 |
| 7,156,334 B1 | 1/2007 | Fore et al. | 242/171 |
| 7,178,755 B2 | 2/2007 | Hsu et al. | 242/423.1 |
| 7,198,152 B2 | 4/2007 | Barton et al. | 206/409 |
| 7,220,942 B2 | 5/2007 | Barton et al. | 219/137.7 |
| 7,309,038 B2 | 12/2007 | Carroscia | 206/409 |
| 7,377,388 B2 | 5/2008 | Hsu et al. | 206/389 |
| RE40,351 E | 6/2008 | Cipriani | 242/423.1 |
| 7,398,881 B2 | 7/2008 | Barton et al. | 206/408 |
| 7,410,111 B2 | 8/2008 | Carroscia | 242/566 |
| 7,441,657 B2 | 10/2008 | Gelmetti | 206/393 |
| 7,441,721 B2 | 10/2008 | Bae et al. | 242/128 |
| 7,533,906 B2 | 5/2009 | Luettgen et al. | 285/146.1 |
| 7,563,840 B2 | 7/2009 | Ye | 524/449 |
| 7,748,530 B2 | 7/2010 | Hsu et al. | 206/408 |
| 7,950,523 B2 | 5/2011 | Gelmetti | 206/408 |
| 8,207,475 B2 | 6/2012 | Minato et al. | 219/137.31 |
| 8,235,210 B2 | 8/2012 | De Lacerda et al. | 206/393 |
| 8,882,018 B2 * | 11/2014 | Gelmetti | B65D 85/04 242/128 |
| 2001/0014706 A1 | 8/2001 | Sprenger et al. | 523/400 |
| 2002/0000391 A1 | 1/2002 | Kawasai et al. | 206/408 |
| 2002/0003014 A1 | 1/2002 | Homma | |
| 2002/0014477 A1 | 2/2002 | Lee et al. | |
| 2002/0039869 A1 | 4/2002 | Achille | 442/417 |
| 2002/0120178 A1 | 8/2002 | Tartaglia et al. | 600/114 |
| 2003/0006235 A1 | 1/2003 | Przytulla | 220/485 |
| 2003/0042162 A1 | 3/2003 | Land | 206/408 |
| 2003/0042163 A1 | 3/2003 | Cipriant | |
| 2003/0052030 A1 | 3/2003 | Gelmetti | 206/397 |
| 2003/0184086 A1 | 10/2003 | Christianson | 285/146.1 |
| 2004/0020041 A1 | 2/2004 | Ferguson, III et al. | |
| 2004/0050441 A1 | 3/2004 | Roschi | 138/120 |
| 2004/0133176 A1 | 7/2004 | Muthiah et al. | 604/368 |
| 2004/0155090 A1 | 8/2004 | Jensen | |
| 2004/0176557 A1 | 9/2004 | Mertens et al. | 526/328.5 |
| 2004/0186244 A1 | 9/2004 | Hatsuda et al. | 525/451 |
| 2004/0201117 A1 | 10/2004 | Anderson | 264/4.3 |
| 2004/0241333 A1 | 12/2004 | Cielenski et al. | 427/421.1 |
| 2004/0265387 A1 | 12/2004 | Hermeling et al. | 424/486 |
| 2005/0008776 A1 | 1/2005 | Chhabra et al. | 427/180 |
| 2005/0258290 A1 | 11/2005 | Kuper | 242/171 |
| 2005/0261461 A1 | 11/2005 | Maeda et al. | 528/272 |
| 2006/0027699 A1 | 2/2006 | Bae et al. | |
| 2006/0074154 A1 | 4/2006 | Harashina et al. | 524/115 |
| 2006/0155254 A1 | 7/2006 | Sanz et al. | 604/378 |
| 2006/0196794 A1 * | 9/2006 | Nicklas | B65D 85/04 206/389 |
| 2006/0247343 A1 | 11/2006 | Kishimoto et al. | 524/117 |
| 2006/0258824 A1 | 11/2006 | Oshima et al. | 525/533 |
| 2006/0278747 A1 | 12/2006 | Carroscia | |
| 2007/0045141 A1 * | 3/2007 | Gelmetti | B23K 9/1333 206/409 |
| 2007/0056943 A1 | 3/2007 | Tenbrink | 219/130.01 |
| 2007/0175786 A1 | 8/2007 | Nicklas | |
| 2007/0175965 A1 | 8/2007 | Carroscia | |
| 2007/0272573 A1 | 11/2007 | Gelmetti | |
| 2007/0284354 A1 | 12/2007 | Laymon | 219/137.51 |
| 2008/0156925 A1 | 7/2008 | Cooper | 242/559.3 |
| 2008/0257875 A1 | 10/2008 | De Keizer | 219/137.44 |
| 2008/0300349 A1 | 12/2008 | Fuchikami et al. | 524/117 |
| 2008/0314876 A1 | 12/2008 | Pinsonneault et al. | 219/74 |
| 2009/0014572 A1 | 1/2009 | Weissbrod et al. | |
| 2009/0014579 A1 | 1/2009 | Bender et al. | |
| 2009/0200284 A1 | 8/2009 | Sanchez | 219/137.51 |
| 2010/0116803 A1 | 5/2010 | Gelmetti | 219/138 |
| 2011/0073703 A1 | 3/2011 | Gelmetti et al. | 242/615.2 |
| 2011/0094911 A1 | 4/2011 | Gelmetti | 206/408 |
| 2011/0114523 A1 | 5/2011 | Gelmetti | 206/407 |
| 2011/0114617 A1 | 5/2011 | Gelmetti et al. | 219/137.9 |
| 2011/0132880 A1 | 6/2011 | Kossowan | 219/76.14 |
| 2012/0298630 A1 | 11/2012 | Stoutamire | 219/75 |
| 2013/0193259 A1 | 8/2013 | Weissbrod et al. | 242/566 |

FOREIGN PATENT DOCUMENTS

| | | | |
|---|---|---|---|
| DE | 152978 | 8/1903 | |
| DE | 1011840 B | 7/1957 | B21C 47/04 |
| DE | 1082215 | 11/1957 | B21C 47/10 |
| DE | 1 154 624 | 9/1963 | C08G 59/40 |
| DE | 2122958 | 11/1972 | B21C 47/14 |
| DE | 2 148 348 | 4/1973 | D01F 7/04 |
| DE | 2202177 | 7/1973 | B65H 54/80 |
| DE | 2525938 | 12/1976 | B23K 9/18 |
| DE | 26 46 218 | 4/1977 | C07F 9/32 |
| DE | 28 16 100 | 10/1978 | C08G 63/68 |
| DE | 36 09 869 | 10/1989 | F16L 57/00 |
| DE | 19909214 | 3/1999 | C08J 9/20 |
| DE | 199 10 128 | 1/2001 | A61B 1/008 |
| DE | 19958697 | 6/2001 | B01J 20/00 |
| DE | 100 06 592 | 8/2001 | C08G 59/18 |
| DE | 10202839 | 1/2002 | B01J 13/00 |
| DE | 103 60 466 | 7/2005 | B23K 9/133 |
| DE | 102007015946 | 2/2008 | B23K 9/133 |
| DE | 202011104120 | 1/2012 | B23K 9/133 |
| EP | 0017445 | 10/1980 | B65H 59/10 |
| EP | 0408259 | 4/1992 | |
| EP | 0519424 A1 | 12/1992 | B23K 9/1333 |
| EP | 0584056 | 2/1994 | B65D 85/04 |
| EP | 0665 166 | 1/1995 | B65D 5/44 |
| EP | 0686439 A1 | 12/1995 | B21C 47/14 |
| EP | 0806429 | 11/1997 | C07F 9/655 |
| EP | 1057751 A1 | 12/2000 | |
| EP | 1 070 754 | 1/2001 | C09K 21/10 |
| EP | 1 275 595 | 1/2003 | B65D 85/04 |
| EP | 1 295 813 | 3/2003 | B65D 85/04 |
| EP | 1357059 | 10/2003 | B65D 85/04 |
| EP | 1 471 024 | 10/2004 | B65H 49/08 |
| EP | 1 698 421 | 6/2006 | B23K 9/133 |
| EP | 1932613 | 6/2008 | B23K 9/133 |
| EP | 1 974 846 | 10/2008 | B23K 9/133 |
| EP | 2 256 064 | 1/2010 | B65H 49/08 |
| EP | 2 354 039 | 1/2010 | B65D 85/04 |
| EP | 2 168 706 | 3/2010 | B23K 9/133 |
| EP | 2 286 950 | 2/2011 | B23K 9/133 |
| EP | 2484476 | 8/2012 | B23K 9/32 |
| EP | 2695696 | 2/2014 | B23K 9/12 |
| EP | 2933202 | 10/2015 | |
| FR | 1215111 | 4/1960 | B21C 47/10 |
| FR | 2055181 | 5/1971 | B23K 35/02 |
| FR | 2 267 255 | 4/1974 | |
| FR | 2595674 | 3/1988 | B21C 47/14 |
| FR | 2 888 825 | 1/2007 | B65H 57/14 |
| GB | 880502 | 10/1961 | B21C 47/14 |
| GB | 1168928 | 10/1969 | D07B 7/10 |

(56) References Cited

FOREIGN PATENT DOCUMENTS

| | | | |
|---|---|---|---|
| GB | 1229913 | 4/1971 | ............ B21C 47/14 |
| GB | 1 575 157 | 9/1980 | ............ C09K 21/12 |
| GB | 2059462 | 4/1981 | ............. A23G 3/02 |
| GB | 2 264 482 | 9/1993 | |
| GB | 2 332 451 | 6/1999 | ............ B65H 57/18 |
| JP | 49-13065 | 2/1974 | |
| JP | 54-035842 | 3/1979 | ............. B65D 1/28 |
| JP | 54-043856 | 4/1979 | ............ B21C 47/08 |
| JP | 55-054295 | 4/1980 | ............ B23K 35/02 |
| JP | 55-156694 | 12/1980 | .......... B23K 35/368 |
| JP | 56-023376 | 3/1981 | ............. B23K 9/00 |
| JP | 57-102471 | 6/1982 | ............ B65H 54/82 |
| JP | 58-035068 | 3/1983 | ............. B23K 9/12 |
| JP | 58-70384 | 5/1983 | ............ B65D 85/04 |
| JP | 59-197386 | 11/1984 | ............ B23K 11/30 |
| JP | 59-229287 | 12/1984 | ............. B23K 9/12 |
| JP | 59-232669 | 12/1984 | ............. B23K 9/12 |
| JP | 60-021181 | 2/1985 | ............. B23K 9/12 |
| JP | 60-032281 | 2/1985 | ............. C04B 41/82 |
| JP | 60-184422 | 9/1985 | ............ B21C 47/26 |
| JP | 60-082275 | 10/1985 | ............. B23K 9/12 |
| JP | 60-082276 | 10/1985 | ............. B23K 9/12 |
| JP | 60-223664 | 11/1985 | ............. B23K 9/12 |
| JP | 61-162541 A | 7/1986 | ............. C08K 5/49 |
| JP | 61-293674 | 12/1986 | ............. B23K 9/12 |
| JP | 62-009774 | 1/1987 | ............. B23K 9/12 |
| JP | 62-111872 | 5/1987 | ............ B65H 49/08 |
| JP | 62-287055 | 12/1987 | ............... C22F 1/10 |
| JP | 63-147781 | 6/1988 | ............ B65H 59/06 |
| JP | 1-65265 | 4/1989 | ............ C23C 14/56 |
| JP | 1-240222 | 9/1989 | |
| JP | 3-264169 | 11/1991 | ............ B23K 9/133 |
| JP | 03264169 A | 11/1991 | ............ B23K 9/133 |
| JP | 4-112169 | 4/1992 | ............. B23K 9/12 |
| JP | 04-133973 | 5/1992 | ............ B65H 59/06 |
| JP | 4-274875 | 9/1992 | ............ B21C 47/04 |
| JP | H05112352 | 5/1993 | ............. B65D 5/44 |
| JP | 5-178538 | 7/1993 | ............ B65H 59/06 |
| JP | 7-247058 | 9/1995 | ............ B21C 47/24 |
| JP | 8-40642 | 2/1996 | ............ B21C 47/28 |
| JP | 08-150492 | 6/1996 | ............ B23K 35/02 |
| JP | 08-267274 | 10/1996 | ............ B23K 35/30 |
| JP | 2000-202630 | 7/2000 | ............ B23K 9/133 |
| JP | 2000-225468 | 8/2000 | ............. B23K 9/12 |
| JP | 2000-263239 | 9/2000 | ............ B23K 11/00 |
| JP | 2001-26375 | 1/2001 | ............ B65H 75/16 |
| JP | 2001-150187 | 6/2001 | ............. B21D 3/06 |
| JP | 2001-323268 A | 11/2001 | ............ C07F 9/6574 |
| JP | 2004-025220 | 1/2004 | ............ B23K 9/133 |
| JP | 2004-025242 | 1/2004 | ............ B23K 35/20 |
| JP | 2004-025243 | 1/2004 | ............. B23K 9/12 |
| JP | 2005-169499 | 6/2005 | ............ B23K 9/133 |
| JP | 2007-927 | 1/2007 | ............ B23K 9/133 |
| JP | 2007-29971 | 2/2007 | ............ B23K 9/133 |
| KR | 2002-0077857 | 10/2002 | ............ B65D 85/04 |
| KR | 2004-0059894 | 12/2002 | ............ B23K 9/133 |
| KR | 1020040059891 | 7/2004 | ............ B23K 9/133 |
| RU | 793678 | 1/1981 | ............ B21C 47/02 |
| RU | 1412830 | 7/1988 | ............ B21C 47/02 |
| WO | WO 81/03319 | 11/1981 | ............ B65D 25/52 |
| WO | WO 8810230 | 12/1988 | ............ B65H 49/08 |
| WO | WO 94-00493 | 1/1994 | ............. A61K 39/00 |
| WO | WO 94-19258 | 9/1994 | ............. B65D 5/10 |
| WO | WO 97/00878 | 1/1997 | ............ C07F 9/6571 |
| WO | WO 98/52844 | 11/1998 | ............ B65D 85/04 |
| WO | WO 00-50197 | 8/2000 | ............ B23C 19/00 |
| WO | WO 01/27365 | 4/2001 | ............... D01H 4/28 |
| WO | WO 02/094493 | 11/2002 | |
| WO | WO 03-106096 A1 | 12/2003 | ............ B21C 47/20 |
| WO | WO 2005/005704 | 1/2005 | ............ D04H 13/02 |
| WO | WO 2005/061168 | 7/2005 | |
| WO | 2006091075 | 8/2006 | ............ B23K 9/133 |
| WO | WO 2007/010171 | 1/2007 | ............ B65H 57/00 |
| WO | WO 2007/112972 | 10/2007 | ............ B23K 9/133 |
| WO | WO 2007/149689 | 12/2007 | ............ B65H 57/18 |
| WO | WO 2009/007845 | 1/2009 | ............ B23K 9/133 |
| WO | WO 2009/027784 | 3/2009 | ............ B23K 9/133 |
| WO | WO 2009/143917 | 12/2009 | ............ B65H 57/14 |
| WO | WO 2011/147565 | 12/2011 | ............ B23K 9/133 |
| WO | WO 2013/092658 | 6/2013 | ............ B65H 57/18 |

OTHER PUBLICATIONS

Office Action issued in U.S. Appl. No. 14/195,497, dated Mar. 23, 2017 (24 pgs).
Office Action issued in U.S. Appl. No. 13/912,016, dated Apr. 21, 2017 (25 pgs).
Office Action issued in U.S. Appl. No. 14/850,753, dated Aug. 25, 2017 (64 pgs).
"International Plastics Flammability Handbook" Jurgen Troitzsch, $2^{nd}$ edition, 1990, pp. 33, 43-49 and 59.
Chinese Official Action dated Mar. 17, 2010.
EPO Office Action issued for related application No. 09753572.8, dated May 2, 2012 (5 pgs).
European Office Action for corresponding application No. 10 014 553.1-2302, dated Apr. 3, 2012 (4 pgs).
European Office Action issued for 09777298.2, dated Aug. 31, 2012 (4 pgs).
European Search Report, dated Mar. 2, 2011 (7 pgs).
European Search Report, dated Sep. 17, 2008.
Extended European Search Report issued in related application No. 13179908.2, dated Nov. 13, 2013 (6 pgs).
Hansen et al., "Water Absorption and Mechanical Properties of Electrospun Structured Hydrogels", Journal of Applied Polymer Science, vol. 95, pp. 427-434 (2005).
International Preliminary Report on Patentability issued for related application No. PCT/EP2009/001285, dated Nov. 30, 2010 (7 pgs).
International Preliminary Report on Patentability, dated Sep. 16, 2010 (5 pgs).
International Preliminary Report, PCT/IPEA/409, dated Dec. 23, 2005, 7 pages.
International Search Report and Written Opinion issued in corresponding PCT Appln. No. PCT/EP2009/005246, dated Apr. 6, 2010 (9 pgs).
International Search Report issued in Applicants' underlying PCT Application Serial No. PCT/EP09/001285, dated Feb. 24, 2009 (3 pgs).
International Search Report, dated Jul. 6, 2009 (3 pgs).
Italian Search Report issued in related application No. MI20121423, dated Apr. 29, 2013 (2 pgs).
Korean Official Action dated May 16, 2011, Appln. No. 2008-7005433, (3 pgs).
Notice of Allowance dated Mar. 18, 2013 issued in U.S. Appl. No. 12/994,686 (10 pgs).
Notice of Allowance dated Mar. 5, 2013 issued in U.S. Appl. No. 12/593,271 (15 pgs).
Notice of Allowance issued in related application No. 12/917,320 dated. Jun. 18, 2012 (25 pgs).
Notice of Allowance issued in related U.S. Appl. No. 13/330,314, dated Sep. 11, 2014 (17 pgs).
Office Action issued for related U.S. Appl. No. 12/618,250, dated Apr. 26, 2012 (11 pgs).
Office Action issued in U.S. Appl. No. 13/912,016, dated Sep. 22, 2016 (13 pgs).
Office Action issued in related U.S. Appl. No. 12/572,994 dated Nov. 25, 2011 (11 pgs).
Office Action issued in related U.S. Appl. No. 12/572,994 dated Aug. 12, 2011 (13pgs).
Office Action issued in related U.S. Appl. No. 12/572,994, dated Apr. 24, 2013 (22 pgs).
Office Action issued in related U.S. Appl. No. 12/593,271 dated Aug. 31, 2012 (7pgs).
Office Action issued in related U.S. Appl. No. 12/789,095 dated Jun. 12, 2012 (8pgs).
Office Action issued in related U.S. Appl. No. 13/330,314, dated Feb. 28, 2014 (10 pgs).

(56) References Cited

OTHER PUBLICATIONS

Office Action issued in related U.S. Appl. No. 13/330,314, dated Jun. 20, 2014 (14 pgs).
Office Action issued in related U.S. Appl. No. 13/382,491, dated Jul. 11, 2013 (15 pgs).
Office Action issued in related U.S. Appl. No. 14/030,879, dated Dec. 1, 2014 (38 pgs).
PCT International Search Report, dated Nov. 6, 2008 (18 pgs).
Plaza et al., Preparation of ethylenebis(nitrilodimethylene)tetrakis(phenylphosphinic acid), Inorganic Synthesis, vol. 16, No. 199, abstract, one page.
Search Report received in Applicant's counterpart European Patent Application Serial No. 08017572.2-2302, dated Mar. 13, 2009.
Search Report received in Applicant's counterpart European Patent Application Serial No. 10014216.5-1256 (8 pages), dated Apr. 14, 2011.
Search Report received in Applicant's counterpart European Patent Application Serial No. 11000892.7-2302 (8 pages), dated Jul. 19, 2011.
Search Report received in Applicant's counterpart European Patent Application Serial No. 11000236.7 (8 pages), dated Aug. 4, 2011.
U.S. Office Action issued in related U.S. Appl. No. 12/572,994, dated Sep. 17, 2013 (13 pgs).
Ullmanns Encyclopedia of Industrial Chemistry, Sulfuric Acid & Sulfur Trioxide to Tetrahydrofuran, Superabsorbents, 6$^{th}$ Edition, vol. 35, pp. 73, 80, 86 and 89 (2003.
U.S. Official Action dated Dec. 14, 2012, issued in U.S. Appl. No. 12/994,686 (17 pgs).
U.S. Official Action dated Feb. 13, 2012, issued in U.S. Appl. No. 12/917,320 (14 pgs).
U.S. Official Action dated Mar. 5, 2013 issued in U.S. Appl. No. 13/382,491 (33 pgs).
Notice of Allowance issued in U.S. Appl. No. 14/850,753, dated Jan. 19, 2018 (14 pgs).
Office Action issued in U.S. Appl. No. 13/912,016, dated Dec. 15, 2017 (25 pgs).
U.S. Appl. No. 10/526,539, filed Mar. 3, 2005.
U.S. Appl. No. 10/596,697, filed Jun. 21, 2006.
U.S. Appl. No. 11/466,048, filed Aug. 21, 2006.
U.S. Appl. No. 12/545,717, filed Aug. 21, 2009.
U.S. Appl. No. 12/545,720, filed Aug. 21, 2009.
U.S. Appl. No. 12/593,271, filed Sep. 25, 2009.
U.S. Appl. No. 12/572,994, filed Oct. 2, 2009.
U.S. Appl. No. 12/618,165, filed Nov. 13, 2009.
U.S. Appl. No. 12/618,250, filed Nov. 13, 2009.
U.S. Appl. No. 12/691,554, filed Jan. 21, 2010.
U.S. Appl. No. 12/789,095, filed May 27, 2010.
U.S. Appl. No. 12/994,686, filed Nov. 24, 2010.
U.S. Appl. No. 13/330,314, filed Dec. 19, 2011.
U.S. Appl. No. 13/382,491, filed Jan. 5, 2012.
U.S. Appl. No. 13/744,394, filed Jan. 17, 2013.
U.S. Appl. No. 13/912,016, filed Jun. 6, 2013.
U.S. Appl. No. 14/030,879, filed Sep. 18, 2013.
U.S. Appl. No. 14/195,497, filed Mar. 3, 2014.
U.S. Appl. No. 14/289,090, filed May 28, 2014.
U.S. Appl. No. 14/481,722, filed Sep. 9, 2014.
U.S. Appl. No. 14/679,768, filed Apr. 6, 2015.
U.S. Appl. No. 14/850,753, filed Sep. 10, 2015.
U.S. Appl. No. 13/912,016, filed Jun. 6, 2013, Gelmetti.
European Search Report issued in application No. 17191662.0, dated Mar. 5, 2018 (8 pgs).

\* cited by examiner

WELDING WIRE CONTAINER

The invention relates to a welding wire container.

BACKGROUND OF THE INVENTION

Welding wire for automatic or semi-automatic welding processes is often provided in the form of a coil consisting of several kilometers of welding wire. For transportation and storage of the welding wire coil, the welding wire container is used which has two primary functions. First, the container serves as a means for transporting the welding wire coil and for protecting it. In particular, the container is to be sufficiently rigid so as to prevent a deformation of the welding wire coil or an entanglement of the individual turns of the welding wire. Second, the welding wire container serves as a take-out device allowing continuous withdrawal of the welding wire from the coil.

Welding wire containers are known which have a base element (for example a wooden pallet) to which a plurality of walls are attached. The walls can be made from cardboard and circumscribe a space in which the coil of welding wire can be placed. In an embodiment where the welding wire container has a square cross section, four cardboard walls are used.

In the corners of the reception space for the welding wire coil, reinforcement posts are arranged. They serve as a radial support or abutment for the welding wire coil.

Usually, a plastic foil is arranged inside the welding wire container so as to protect the welding wire coil against humidity.

For transportation, the welding wire container is often provided with a plastic wrapping on its outside. The plastic wrapping increases the stability of the container. It is, however, essential that the plastic wrapping be removed when the welding wire container has been placed at the spot where the welding wire is withdrawn from the container as the plastic wrapping exerts an inwardly directed pressure. This pressure usually does not create any issues as long as only a small fraction of the welding wire has been withdrawn from the container because the considerable weight of the welding wire coil prevents the reinforcement posts from being displaced inwardly. If however a significant portion of the welding wire has been withdrawn, the pressure of the plastic wrapping is able to displace the reinforcement posts inwardly which might result in a retainer plate floating on top of the welding wire coil being pinched between the reinforcement posts.

Another issue sometimes encountered during operation results from improper handling of the plastic foil arranged inside the welding wire container for protecting the welding wire. Despite instructions to place the upper portion of the plastic foil along the outer surface of the container walls, it can sometimes be seen that the upper portion is cut off. This may result in some portions of the plastic foil falling into the container so as to interfere with the welding wire and/or the retainer.

The object of the invention is to improve the welding wire container so as to ensure that the welding wire can be properly withdrawn from the container even if the operating instructions are not being properly observed.

BRIEF DESCRIPTION OF THE INVENTION

In order to achieve this object, the invention provides a welding wire container having a base element, a plurality of walls which extend upwardly from the base element and circumscribe a space in which a coil of welding wire can be placed, with an reinforcement post being arranged in each of the corners of the space, a spacing rod being provided between adjacent reinforcement posts. The spacing rods provided between the reinforcement posts ensure that they cannot be displaced inwardly by an external pressure such as the pressure exerted by a plastic wrapping. Thus, it is guaranteed that there is the proper free space between the posts which allows a retainer floating on the welding wire coil to freely descend when the welding wire is being withdrawn. Further, the spacing rods prevent the plastic foil from dropping into the interior of the container.

According to a preferred embodiment, each of the spacing rods extends in a plane which is parallel to a plane defined by the base element of the welding wire container. This orientation of the spacing rods ensures that there is no vertical force which is being generated when an inwardly directed pressure is exerted on the reinforcement posts.

According to an embodiment of the invention, each of the spacing rods is arranged at a small distance from the upper end, the distance being in the order of 1 to 10 inches. At this position, the spacing rods do not interfere with a retainer on top of the welding wire coil.

According to a preferred embodiment, each spacing rod is made from plastic, thereby combining a light weight with a high rigidity and stability.

Preferably, each spacing rod is releasably connected with two of the reinforcement posts. This allows a quick mounting and also a disconnection of the spacing rod from the reinforcement posts for later recycling.

In order to facilitate mounting, the spacing rod has a latch element at its ends and the reinforcement posts are preferably provided with a complementary latching element, thereby allowing an automatic latching without the need of any tools or complicated mounting mechanism.

According to an advantageous embodiment of the invention, the reinforcement post has a bottom surface with which it rests on a floor which is the lower surface of the space for receiving the welding wire coil, the bottom surface comprising a stop element which protrudes downwardly beyond the bottom surface. The stop element, by extending beyond the bottom surface of the reception space, ensures that no turns of the welding wire can be pinched between the lower end of the reinforcement post and the lower surface of the reception space.

Preferably, the floor of the welding wire container is formed from a layer of cardboard, the cardboard having a cut-out into which the stop element protrudes. The cut-out provides for the space into which the stop element can extend when the reinforcement post is placed on the cardboard.

According to a preferred embodiment of the invention, a positioning element is provided on the floor for each of the reinforcement posts, the positioning element comprising an engagement configuration which engages with a complementary engagement configuration at the respective reinforcement post so as to prevent the reinforcement post from being lifted from the positioning element. The reinforcement post is thus latched to the base of the container, preventing it from being unintentionally separated from the floor of the reception space for the welding wire coil. This even further reduces the risk of welding wire being pinched between the lower end of the reinforcement post and the floor.

The engagement configurations can be a catch and a corresponding recess which engage into each other automatically when the reinforcement post is correctly placed on the positioning element.

The base element of the welding wire container can be in the form of a pallet made from plastic. This material avoids the problems associated with pallets made from wood or cardboard.

According to an embodiment, the base element has a central opening for a lifting yoke. The lifting yoke allows for safer transportation of the welding wire container filled with a welding wire coil as compared to handling the container with a forklift.

The invention will now be described with reference to a preferred embodiment which is shown in the drawings. In the drawings.

Figure 1:
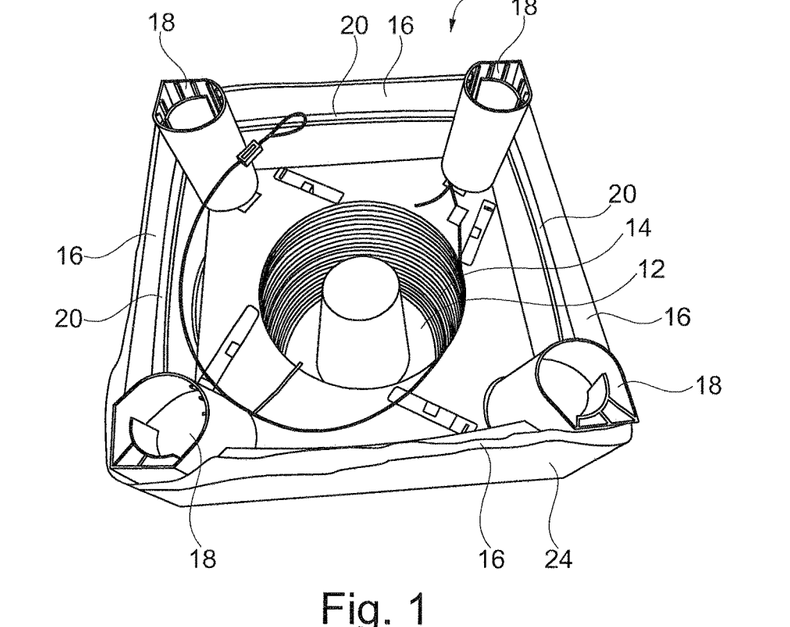
FIG. 1 is a perspective top view of a container containing a welding wire coil.
Figure 2:
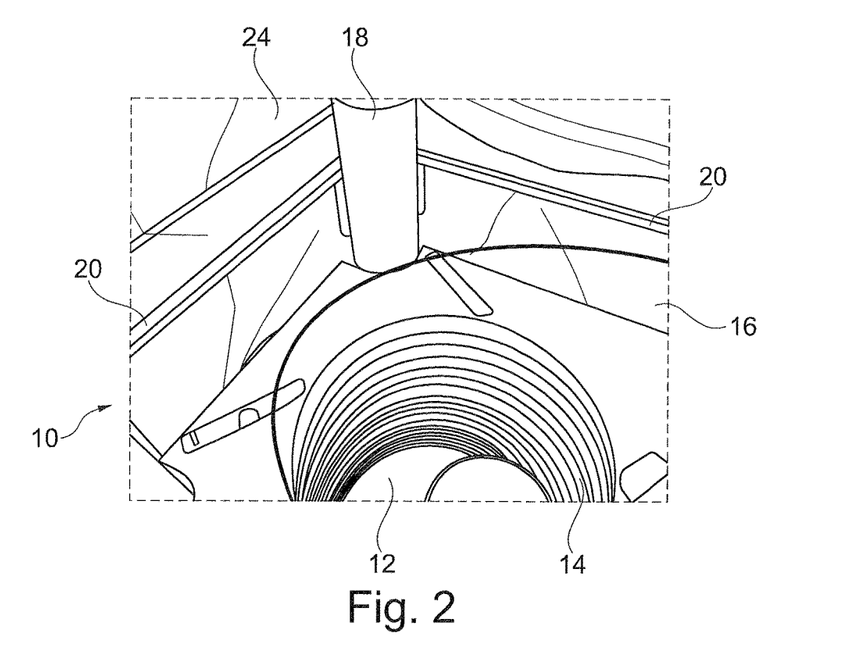
FIG. 2 shows at an enlarged scale a detail of the container of FIG. 1.
Figure 3:
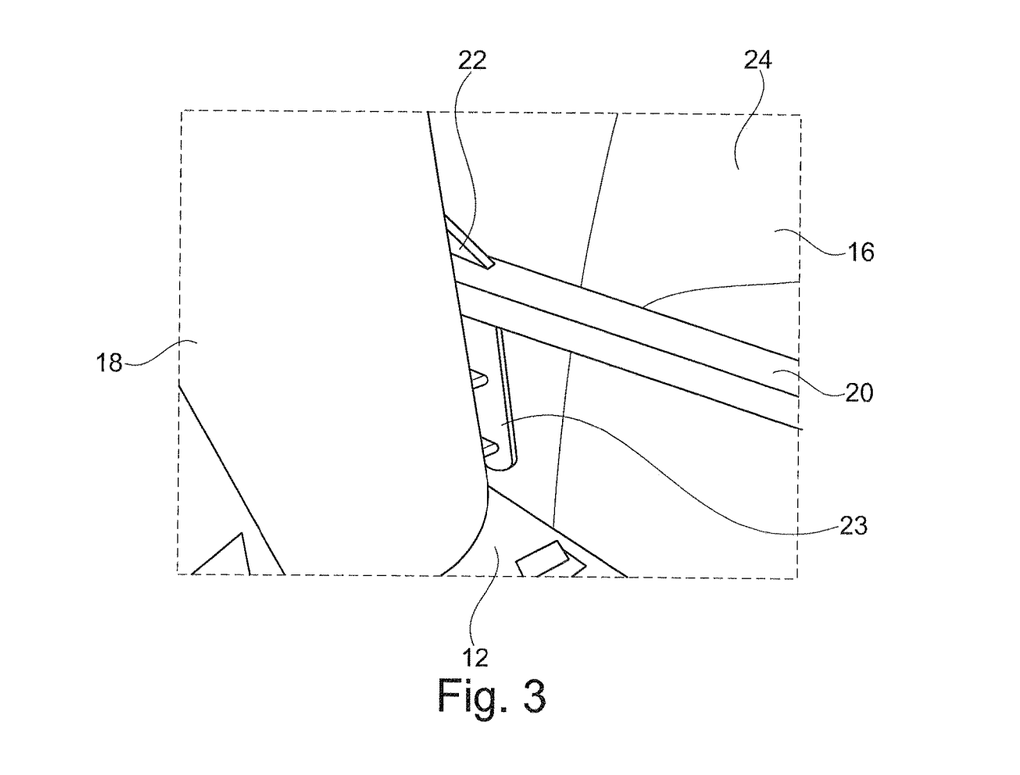
FIG. 3 shows at a further enlarged scale the connection between a reinforcement post and a spacing rod.

In FIGS. 1, 2 and 3, a container 10 for receiving welding wire is shown. Container 10 comprises a floor 12 which is made from a layer of cardboard resting on a base element. The base element will be explained later.

Within container 10, a coil 14 is placed, coil 14 being formed from of windings of welding wire. The length of the welding wire forming coil 14 can be several kilometers, and the weight of the coil can range from some 10 kilograms up to 400 kilograms and more.

On top of welding wire coil 14, a retainer plate 15 is arranged which prevents unintended entanglement of the welding wire turns during wire withdrawal. Retainer plate 15 rests under its proper weight on the upper surface of coil 14 and floatingly descends downwardly when the welding wire is being consumed.

In the shown embodiment, the container 10 has a square cross section. Thus, there are four walls 16 which circumscribe the space in which welding wire coil 14 is placed.

At each corner of the space for receiving coil 14, a reinforcement post 18 is arranged. Viewed in the cross section, each reinforcement post 18 has a drop shaped cross section, with the tip of the drop being placed in the corner formed between adjacent walls 16.

At their lower ends, reinforcement posts 18 are connected to the base element of the welding wire container 10 as will be described later. Close to their upper ends, a plurality of spacing rods 20 is provided. Each spacing rod 20 extends between adjacent reinforcement posts 18 and is capable of absorbing forces which tend to push reinforcement posts 18 closer together.

As can be seen in more detail in FIG. 3, each end of each spacing rod 20 is provided with a latch element 22 which engages at a complementary latch element 23 provided at reinforcement post 18. This allows to easily mount and disconnect spacing rods 20 to the reinforcement posts 18.

As can be seen in particular in FIG. 2, a plastic foil 24 is arranged inside container 10 between welding wire coil 14 and walls 16. Plastic foil 24 serves as a barrier for humidity. As can be seen in particular in FIG. 3, plastic foil 24 extends in-between wall 16 and spacing rod 20. This guarantees that plastic foil 24 cannot fall into the reception space for welding wire coil 14.

Figure 4:
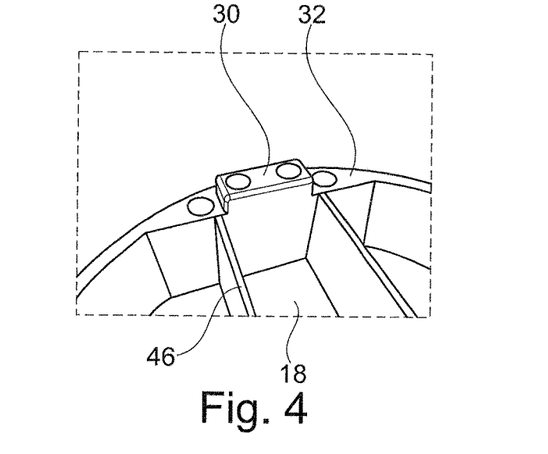
FIG. 4 schematically shows a lower end of a reinforcement post.
Figure 5:
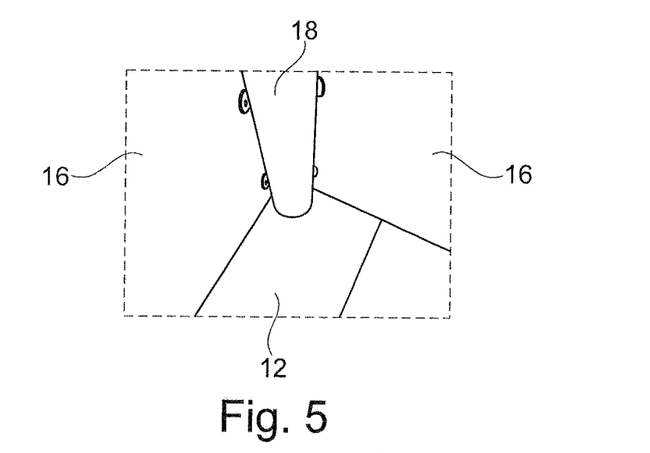
FIG. 5 shoes the lower end of the reinforcement post placed on a floor of the welding wire container.
Figure 6:
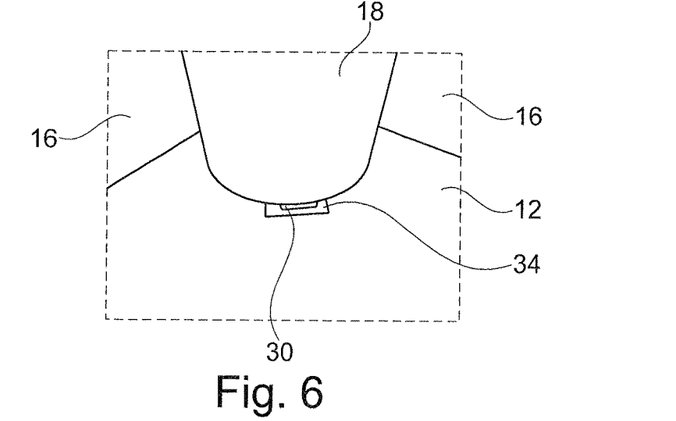
FIG. 6 shows at an enlarged scale the lower end after reinforcement post resting on the floor of the container.

At its lower end, reinforcement post 18 as provided with a stop element 30 which protrudes over a bottom surface 32 with which reinforcement post 18 rests on floor 12 of welding wire container 10. As can be seen in particular in FIG. 6, floor 12 is provided with a cut-out 34 into which stop element 30 of reinforcement post 18 engages. Thus, stop element 30 extends below the surface of floor 12 on which welding wire coil 14 rests. This prevents individual windings of welding wire from becoming pinched between bottom surface 32 of post 18 and floor 12.

Figure 7:
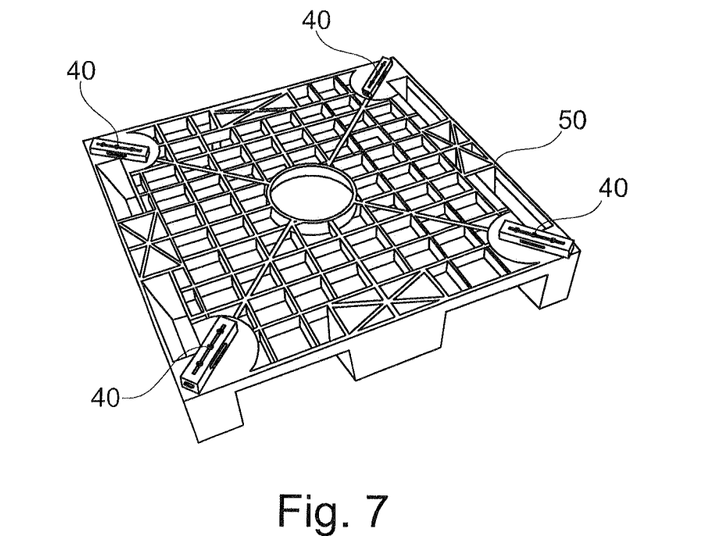
FIG. 7 schematically shows a base of the welding wire container with positioning elements.

For positioning reinforcement posts 18 in the corners of the reception space of welding wire container 10, positioning elements 40 are arranged on base element 50, in particular so as to clamp floor 12 between the four positioning elements 40 and base element 50.

Positioning element 40 can be connected to base element 50 by means of a plurality of attachment elements 42 such as nails, bolts, screws, or rivets.

Each positioning element 40 is provided with at least one engagement configuration 44 which is adapted to engage at a complementary engagement configuration at the lower end of reinforcement post 18. In the embodiment shown in FIG. 8, engagement configurations 44 are in the form of catches which are arranged at the side surfaces of positioning element 42 and at the end face which is oriented towards the center of the reception space for the welding wire coil. The complimentary engagement configurations in the bottom of reinforcement posts 18 are recesses 46.

Figure 8:
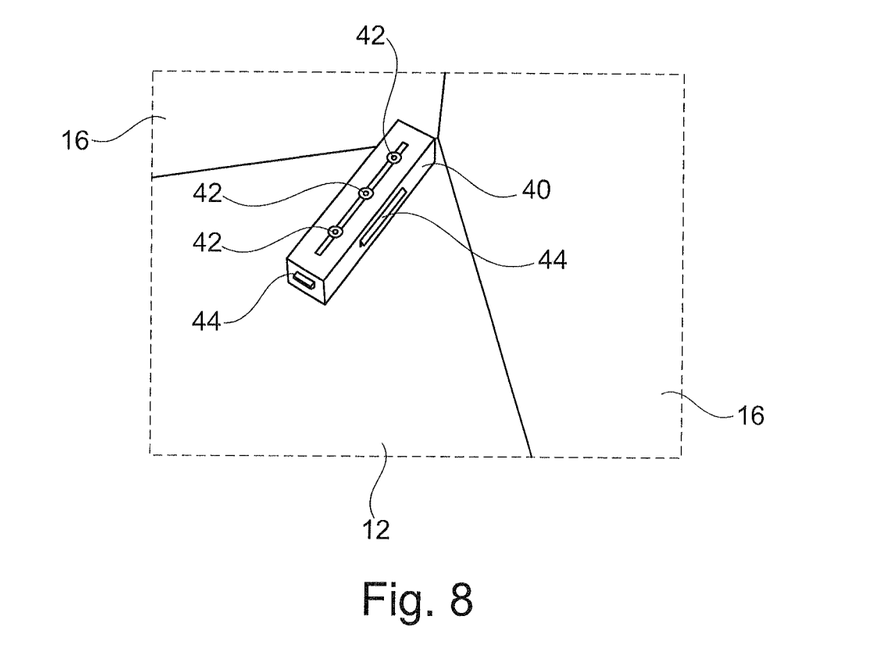
FIG. 8 shows at an enlarged scale the positioning elements arranged in a corner of the container.

When the reinforcement post 18 is placed on positioning element 40, the engagement configurations 44, 46 engage into each other, thereby latching reinforcement post 18 at positioning element 40. It is thus not possible that reinforcement post 18 is unintentionally lifted upwardly.

Figure 9:
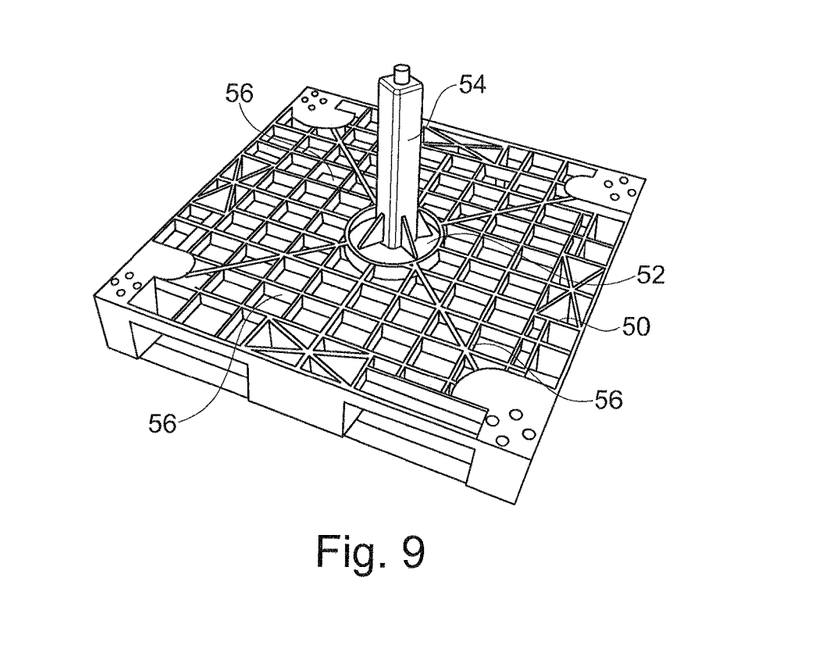
FIG. 9 shows an embodiment of the base of the container.
Figure 10:
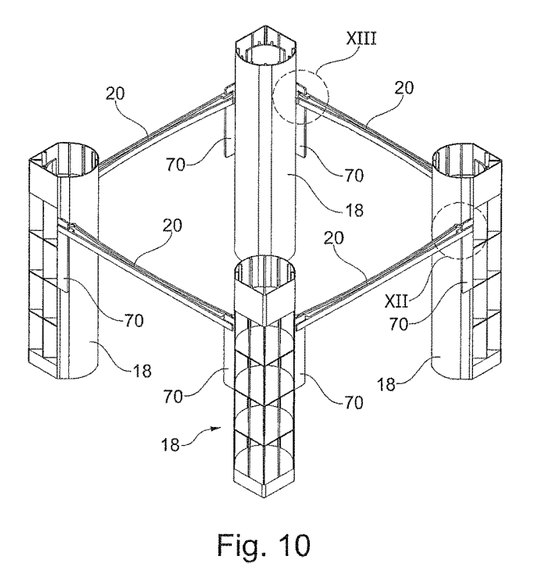
FIG. 10 shows in a perspective view the reinforcement posts with the spacing rods.
Figure 11:
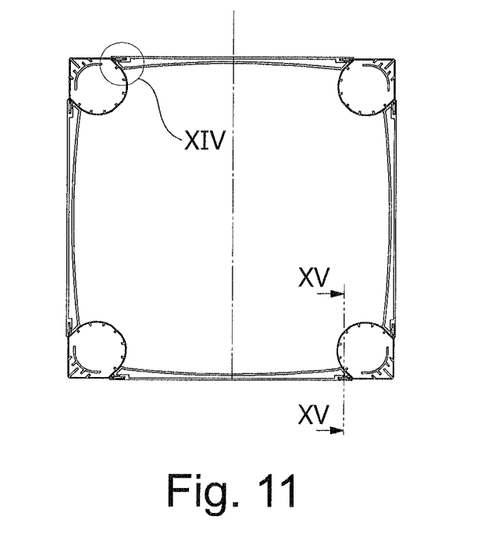
FIG. 11 shows in a top view the reinforcement posts with the spacer rods.
Figure 12:
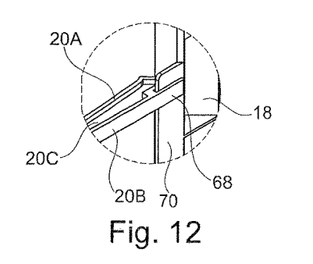
FIG. 12 shows at an enlarged scale detail XII of FIG. 10.
Figure 13:
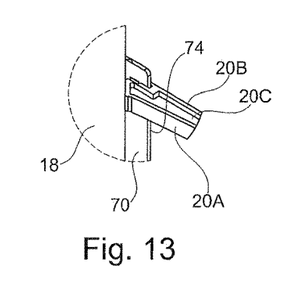
FIG. 13 shows at an enlarged scale detail XIII of FIG. 10.

As can be seen in particular in FIG. 9, base element 50 is in the form of a pallet and is made from plastic. It is provided with a centrally arranged opening 52 through which a lifting yoke 54 can extend. Lifting yoke 54 has a plurality of lifting arms 56 which extend below the central portion of base element 50 and carries the weight of the welding wire coil 14 when container 10 is being lifted and handled.

Details of the reinforcement posts 18 and the spacing rods 20 will now be described with reference to FIGS. 10 to 23.

Reinforcement posts 18 are formed from plastic. As can be seen in particular in FIGS. 10 and 22, reinforcement rods 18 are made in a skeleton manner, with several portions of reinforcement posts 18 directed towards walls 16 of the container being omitted. In order to achieve a high rigidity, the circumferential surface of reinforcement posts 18 is formed in a closed manner at the upper end and at the lower end of each reinforcement post.

Spacing rods 20 have the shape of an H-beam with two flanges 20A, 20B, and an intermediate web 20C.

Figure 21:
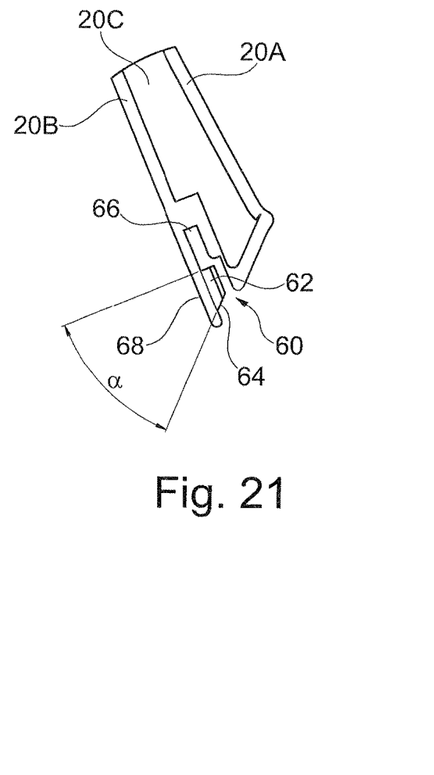
FIG. 21 shows at an enlarged scale the end portion of the spacing rod.
Figure 22:
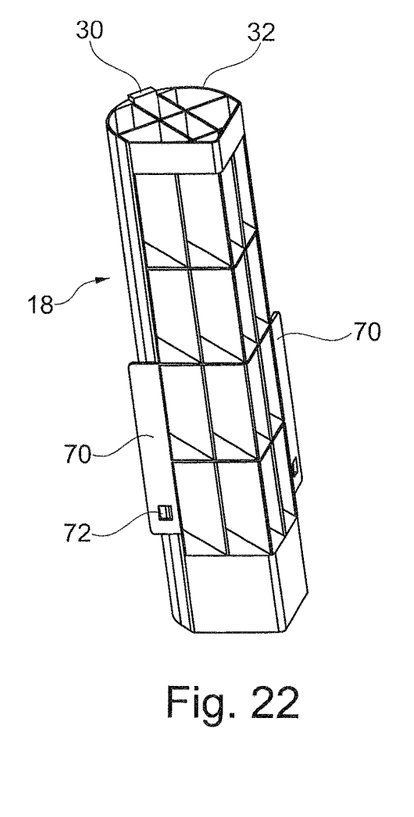
FIG. 22 shows a perspective view of the reinforcement post from the bottom side.
Figure 23:
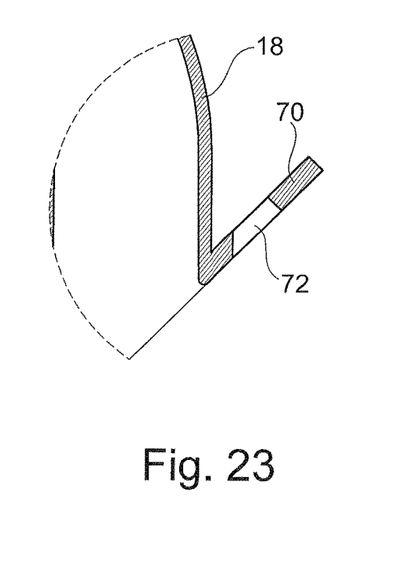
FIG. 23 shows a cross section through a detail of the reinforcement post.

Latch element 22 provided at each and of spacing rod 20 is formed as an elastic slot 60 which have a latching tooth 62 at its forward end. Latching tooth 62 is formed with a chamfered front surface 64 which extends at an angle α with respect to a reward surface of latching tooth 62. Angle α is in the order of 45 degrees.

Figure 14:
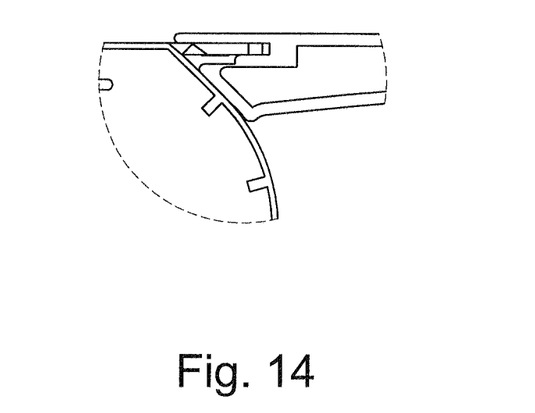
FIG. 14 shows at an enlarged scale detail XIV of FIG. 11.
Figure 15:
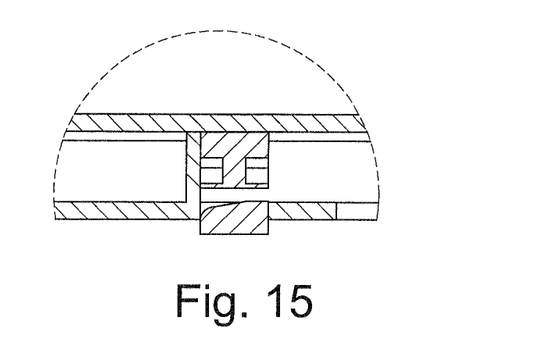
FIG. 15 shows a cross section along lines XV of FIG. 11.
Figures 16, 17, 18, 19:
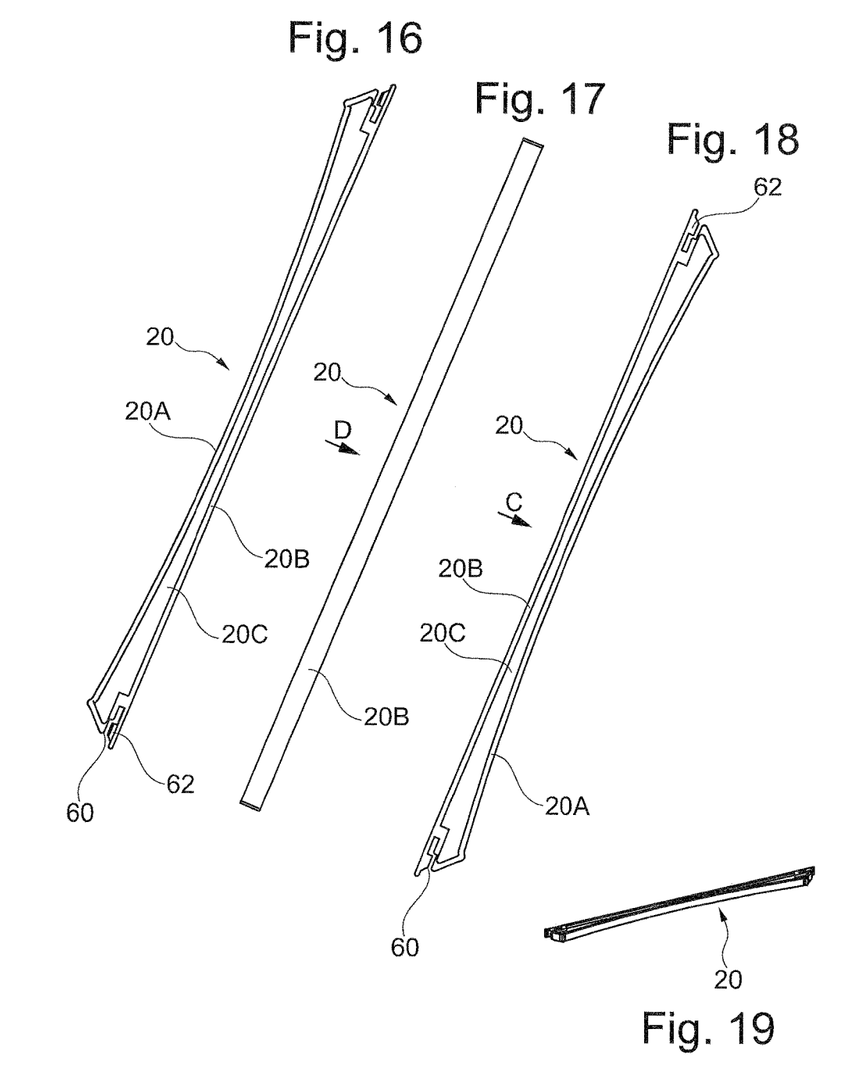
FIG. 16 shows a side view of a spacing rod.
FIG. 17 shows a bottom view of the spacing rod.
FIG. 18 shows a second side view of the spacing rod.
FIG. 19 shows the spacing rod in a perspective view.

The complementary latch element at the side of the reinforcement posts is formed by a plate 70 in which an opening 72 is formed. Each spacing rod can be connected to plate 70 so as to engage with teeth 62 into opening 72. Pushing forces tending to move the reinforcement posts closer together, can be absorbed by bottom surface 66 of the slot 60 abutting at an outer, vertical edge 74 of plate 70.

Figure 20:
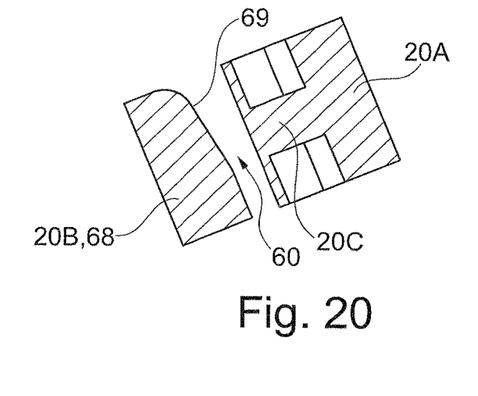
FIG. 20 shows at an enlarged scale the cross section through the spacing rod along line XV-XV of FIG. 11.

As can be seen in particular in FIG. 20, the extension of flange 20A forming one of the borders of slot 60 is provided with a chamfer 69 so as to facilitate the process of mounting spacing rods 20 at reinforcement posts 18.

The invention claimed is:

1. A welding wire container having a base element, a plurality of walls defining corners which extend upwardly from the base element and circumscribe a space for receiving a coil of welding wire, with a reinforcement post being arranged in each corner of the base element, and a respective spacing rod being provided between adjacent reinforcement posts, wherein each of the reinforcement posts has a bottom surface which rests on a floor which is a lower surface of the base element for receiving the welding wire coil, the bottom surface having a stop which protrudes downwardly beyond the bottom surface.

2. The welding wire container of claim 1 wherein each of the spacing rods extends in a plane which is parallel to a plane defined by the base element of the welding wire container.

3. The welding wire container of claim 1 wherein each of the spacing rods is arranged at a distance of 1 to 10 inches from an upper end of the container.

4. The welding wire container of claim 1 wherein the spacing rod is made from plastic.

5. The welding wire container of claim 1 wherein each of the spacing rods is releasably connected with two of the reinforcement posts.

6. The welding wire container of claim 1 wherein each of the spacing rods has a mechanical latch at its ends.

7. The welding wire container of claim 6 wherein each of the mechanical latches comprises a tooth.

8. The welding wire container of claim 7 wherein each of the mechanical latches further comprises a slot in which the tooth is arranged.

9. The welding wire container of claim 6 wherein each of the reinforcement posts is provided with a complementary mechanical latch.

10. The welding wire container of claim 9 wherein a chamfer is provided for facilitating latching to the reinforcement posts.

11. The welding wire container of claim 1 wherein a plastic foil is arranged in the space for receiving the welding wire coil, the plastic foil extending between the spacing rods and the walls.

12. The welding wire container of claim 1 wherein the floor is formed from a layer of cardboard, the cardboard having a cut-out into which the mechanical element protrudes.

13. The welding wire container of claim 1 wherein the positioning elements are provided on the Floor for each of the reinforcement posts, each of the positioning elements comprising mechanical engagement which engages with a complementary mechanical engagement at the respective reinforcement post so as to prevent the reinforcement post from being lifted from the positioning element.

14. The welding wire container of claim 13 wherein the mechanical engagement are a catch and a corresponding recess.

15. The welding wire container of claim 1 wherein the base element is a pallet made from plastic.

16. The welding wire container of claim 1 wherein the base element has a central opening for a lifting yoke.

17. A welding wire container having a base element defining a floor, a plurality of walls defining corners which extend upwardly from the base element and circumscribe a space for receiving a coil of welding wire, with a reinforcement post being arranged in each corner of the base element, and a respective spacing rod being provided between adjacent reinforcement posts, wherein a position element is provided on the floor for each of the reinforcement posts, each positioning element comprising a mechanical engagement which engages with a complementary mechanical engagement at its respective reinforcement post so as to prevent the reinforcement post from being lifted from the positioning element.

18. The welding wire container of claim 17 wherein each of the spacing rods extends in a plane which is parallel to a plane defined by the base element of the welding wire container.

19. The welding wire container of claim 17 wherein each of the spacing rods is arranged at a distance of 1 to 10 inches from an upper end of the container.

20. The welding wire container of claim 17 wherein the spacing rod is made from plastic.

21. The welding wire container of claim 17 wherein each of the spacing rods is releasably connected with two of the reinforcement posts.

22. The welding wire container of claim 17 wherein each of the spacing rods has a mechanical latch at its ends.

23. The welding wire container of claim 22 wherein each of the mechanical latches comprises a tooth.

24. The welding wire container of claim 23, wherein each of the mechanical latches further comprises a slot in which the tooth is arranged.

25. The welding wire container of claim 23, wherein each of the reinforcement posts is provided with a complementary mechanical latch.

26. The welding wire container of claim 23 wherein a chamfer is provided for facilitating latching to the reinforcement posts.

27. The welding wire container of claim 17 wherein a plastic foil is arranged in the space for receiving the welding wire coil, the plastic foil extending between the spacing rods and the walls.

28. The welding wire container of claim 17 wherein the mechanical engagements are a catch and a corresponding recess.

29. The welding wire container of claim 17 wherein the base element is a pallet made from plastic.

30. The welding wire container of claim 17 wherein the base element has a central opening for a lifting yoke.

* * * * *